(12) United States Patent  (10) Patent No.: US 7,334,825 B1
Sammon  (45) Date of Patent: Feb. 26, 2008

(54) VEHICLE LOAD CADDY

(76) Inventor: Albert Sammon, 31350 12th Pl. S., Federal Way, WA (US) 98003

( * ) Notice: Subject to any disclaimer, the term of this patent is extended or adjusted under 35 U.S.C. 154(b) by 0 days.

(21) Appl. No.: 11/470,460

(22) Filed: Sep. 6, 2006

(51) Int. Cl.
  *B25J 1/00* (2006.01)
(52) U.S. Cl. .......................... 294/24; 294/26
(58) Field of Classification Search ............ 294/19.1, 294/24, 26, 51; 15/106, 144.4; 172/372, 172/373, 375
  See application file for complete search history.

(56) References Cited

U.S. PATENT DOCUMENTS

| | | | |
|---|---|---|---|
| 902,124 A * | 10/1908 | Voshell | 279/99 |
| 1,229,843 A * | 6/1917 | Whitaker | 279/91 |
| 2,319,992 A * | 5/1943 | Hubbard | 294/19.1 |
| 2,639,454 A * | 5/1953 | Dory | 15/245 |
| 4,162,132 A * | 7/1979 | Kress et al. | 403/361 |
| 4,624,494 A * | 11/1986 | Huppert | 294/26 |
| 5,487,576 A * | 1/1996 | DuVivier | 294/19.1 |
| 5,538,302 A * | 7/1996 | Travis | 294/24 |
| 6,155,620 A * | 12/2000 | Armstrong | 294/57 |
| D459,959 S * | 7/2002 | Fetterman et al. | D8/14 |
| 6,450,557 B1 * | 9/2002 | Martinez | 294/19.1 |
| D493,680 S * | 8/2004 | Raymond | D8/14 |

* cited by examiner

*Primary Examiner*—Dean J Kramer
(74) *Attorney, Agent, or Firm*—David L. Tingey

(57) ABSTRACT

An extendable pole with an attachment mechanism on its distal end for receiving a selective tool from a set of selective tools. The set of tools includes a push plate for pushing a load slidably in a vehicle such as in a truck bed; a hook for retrieving a load slidably from deep into the vehicle; and a brush head each attachable transversely on the pole distal end to operate nearly vertically with the pole nearly horizontal.

2 Claims, 2 Drawing Sheets

VEHICLE LOAD CADDY

BACKGROUND

1. Field of the Invention

This invention relates to extension pole for a tool, and more specifically, to a set of load adjusting tools each mountable on an extension pole for positioning a load in a vehicle, such as a pickup truck without a user himself entering the pickup bed.

2. Prior Art

It is known to have extension poles for various duties. However, it is not yet known to have an extension pole with a set of various tools attachable to a pole end adapted to facilitate movement of a load within a pickup truck bed without a user himself having to climb up onto the pickup.

Pickup truck users often need to locate a light load in the pickup bed. It is inconvenient and for some not possible or practical to climb into the pickup bed to locate the load. The difficulty experienced in retrieving or positioning a light load in the pickup truck bed from its open tailgate without climbing into the truck bed is sufficient to prevent them from fully using their truck. A tool is needed to assist these users. However, a single tool often does not suffice to both push a load into place and to pull it back toward the tailgate and to sweep the bed after use without climbing into the bed. Therefore various tools should be available and for convenience they should be attachable to a same pole. The load may be located variously about the bed so the pole must be adjustable in length.

Thus it is an object of the present invention to present a pole suitable for a person standing on the ground at the pickup tailgate to move a light load within the pickup bed using a selective accessory tool mounted on a pole distal end opposite a pole proximal handle end. It is also an object that the selective accessory tool be provided in a set of tools each of which can be easily and quickly removably mounted to the pole distal end. It is further object that this set of tools include a tool for pushing the load away from the tailgate to locate it deep into the pickup bed. It is a still further object that this set of tools include a tool for pulling the load toward the tailgate. It is a still further object that this set of tools include a tool for sweeping the pickup bed. It is yet another object that the pole be extendable to reach short distances from the tailgate or the full length of the pickup bed.

SUMMARY

These objects are achieved in an extendable pole with an attachment mechanism on its distal end for receiving attachment thereon of a selective tool from a set of selective tools. The set of tools includes a push plate for pushing a load slidably into the truck bed; a hook for retrieving a load slidably from deep into the truck bed; and a brush for sweeping after the load is located or removed.

The user standing on the ground will use the selective tool with the pole approximately horizontal. An effective tool on the pole distal end therefore optimally will attach transversely on the pole distal end to operate nearly vertically.

DETAILED DESCRIPTION OF THE PREFERRED EMBODIMENTS

Figure 1:
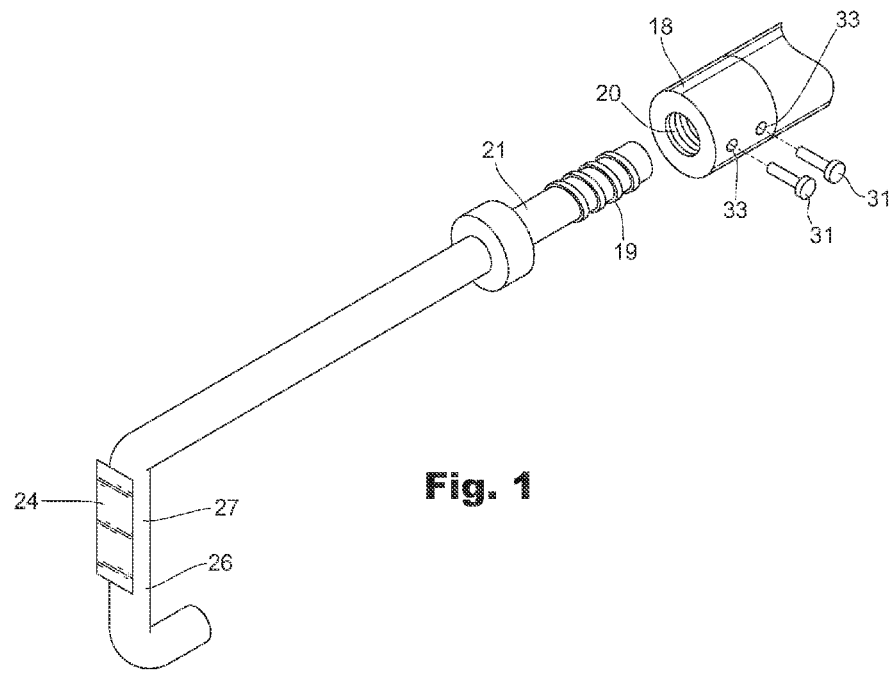
FIG. 1 is a perspective view of the extension pole and combination push plate and hook on the pole distal end.
Figure 2:
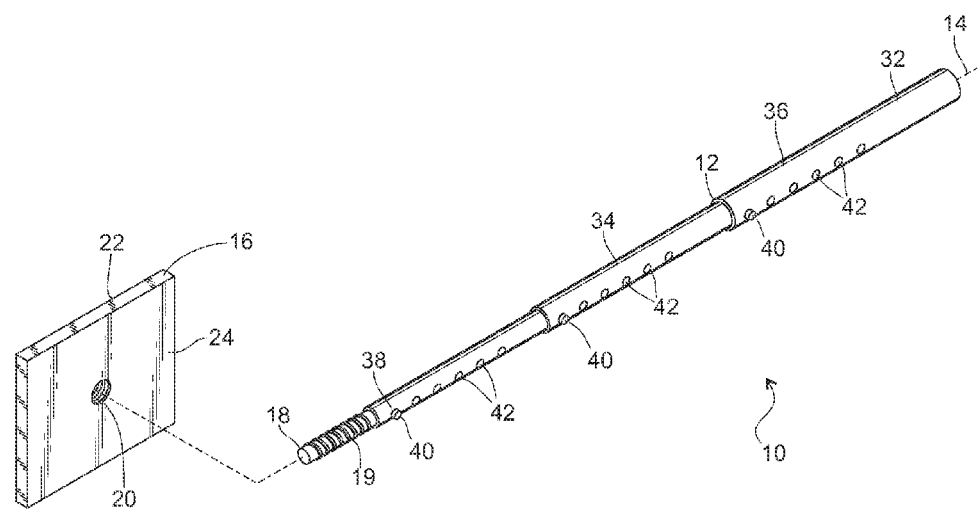
FIG. 2 is perspective view of the extension pole and a push plate spaced from the pole distal in position to releasable mount to the pole.
Figure 3:
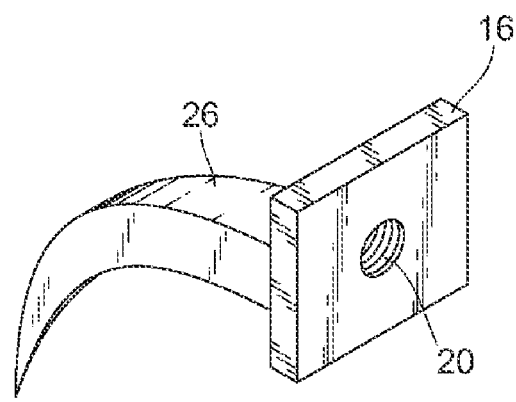
FIG. 3 is a perspective view of a hook attachment adapted to mount to the pole distal end.
Figure 4:
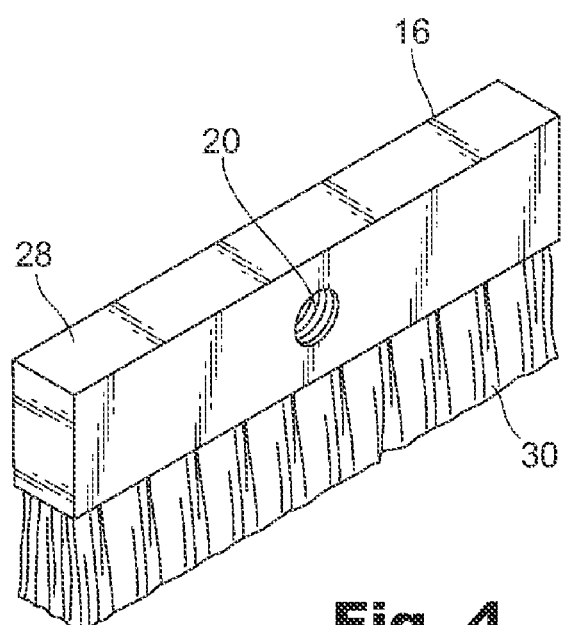
FIG. 4 is a perspective view of a brush attachment adapted to mount to the pole distal end.

The load caddy 10 of the present invention comprises an elongate pole 12 with a longitudinal axis 14 and a set of selective tools 16 each adapted to releasably attach transversely to the pole axis at the pole distal end 18. The pole distal end is adapted to releasably secure one of the selective tools to its distal. Each selective tool is also adapted to match the pole distal end for attachment thereto. Typically, the pole distal end is threaded with large threads 19 and each selective tool 16 has a threaded hole 20 matching the threaded pole distal end 18. The threads 19 are necessarily of large gauge to sustain the load placed upon them as the tool and pole are used to move a light load. Clearly, an alternate embodiment would be to have the threads 19 on an end 21 of the selective tool 16 with the threaded hole 20 on the pole distal end 18.

The set of selective tools 16 includes a load pusher 22 comprising push plate 24 extendable transverse to the pole axis, a hook 26 extendable transversely from the pole, radial to the pole axis, and a brush head 28 for sweeping the vehicle, such as a pickup bed, with brush bristles 30 also extendable transversely to the pole axis. A further alternate embodiment would be to combine features of these selective tools, such as combining a push plate 24 with a hook 26 in a single tool 16, as shown in FIG. 1, with the push plate 24 forward of the hook on a hook leg 27. In such a combination the tool might be secured in place on the pole distal end 18 by pins 31 in holes 33 in pole distal end 18.

For convenience in extending a variable distance into the truck bed, the pole 12 comprises an extension pole 32 with a first member 34 telescoping from a second member 36, adjustable to extend to a selective length and secured at that selective length by a securing mechanism 38 between the first and second members 34, 36. To reach the full length of the truck bed in full extension and to reduce in length to reach a light load relatively near the pickup tailgate without the pole extending inconveniently beyond the user away from the tailgate, the pole extends operationally between two feet and at least ten feet. For convenience of storage the extension may comprise a plurality of members one extending from another such that the pole extends to its selective operational length and collapses to a convenient short length, which may be as short as three feet.

To support the load imposed on the pole in moving a load slidably in the vehicle, the securing mechanism should be a positive lock such as pin through aligned holes in the first and second members as opposed to a frictional interface between them. The preferred embodiment of the securing mechanism is a pin 40 spring-mounted in the second member releasably biased into one of a plurality of holes 42 longitudinally aligned along the first member.

Having described the invention, what is claimed is as follows:

1. A load caddy for moving a light load in a vehicle comprising,
    an elongate extension pole with a longitudinal axis with its distal end being adapted to releasably secure a selective tool thereto, and
    a set of selective tools each of which is adapted to releasably attach transversely to the pole axis at a pole distal end,
wherein the set of selective tools comprises a hook extending transversely from the pole, radial to the pole axis and a push plate mounted on a leg of said hook forward of the hook; and a brush head for sweeping the vehicle with brush bristles extending transversely to the pole axis.

2. A load caddy for moving a light load in a vehicle comprising, an elongate extension pole with a longitudinal axis with its distal end being adapted to releasably secure a selective tool thereto, and a set of selective tools each of which is adapted to releasably attach transversely to the pole axis at a pole distal end, wherein the selective tool comprises a combination of a hook extending transversely from the pole and a push plate on a leg of said hook forward of the hook.

* * * * *